(12) United States Patent
Takahashi et al.

(10) Patent No.: US 8,536,588 B2
(45) Date of Patent: Sep. 17, 2013

(54) DISPLAY DEVICE HAVING AN ANTENNA AND METHOD OF MANUFACTURING SAME

(75) Inventors: Yuji Takahashi, Kawasaki (JP); Toru Ozaki, Kawasaki (JP); Masanobu Hatanaka, Kawasaki (JP); Hirohisa Naito, Kawasaki (JP); Takahiro Kii, Kawasaki (JP); Kazumi Kubota, Kawasaki (JP); Akira Miyazaki, Kawasaki (JP); Takefumi Horie, Kawasaki (JP); Kiyohiko Ikeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 562 days.

(21) Appl. No.: 12/878,213

(22) Filed: Sep. 9, 2010

(65) Prior Publication Data

US 2011/0227800 A1 Sep. 22, 2011

(30) Foreign Application Priority Data

Sep. 10, 2009 (JP) ................. 2009-209631

(51) Int. Cl.
*H01L 21/18* (2006.01)
*H01L 33/00* (2010.01)
*H01Q 1/06* (2006.01)

(52) U.S. Cl.
USPC ............. 257/88; 343/702; 343/720; 343/721; 438/34; 438/59

(58) Field of Classification Search
USPC ............. 343/702, 720, 721; 257/88; 438/34, 438/59; 362/253; 445/24
See application file for complete search history.

(56) References Cited

U.S. PATENT DOCUMENTS

| | | | | |
|---|---|---|---|---|
| 7,209,281 | B2 * | 4/2007 | Takei | 359/296 |
| 7,260,882 | B2 * | 8/2007 | Credelle et al. | 29/600 |
| 7,796,016 | B2 | 9/2010 | Fukuda | |
| 7,868,765 | B2 * | 1/2011 | Ishihara et al. | 340/572.7 |
| 2004/0183788 | A1 * | 9/2004 | Kurashima et al. | 345/173 |
| 2005/0243405 | A1 * | 11/2005 | Takei | 359/296 |
| 2006/0033874 | A1 * | 2/2006 | Sakama et al. | 349/152 |
| 2006/0146271 | A1 * | 7/2006 | Pennaz et al. | 349/182 |
| 2007/0023758 | A1 * | 2/2007 | Tsurume et al. | 257/66 |
| 2007/0069382 | A1 * | 3/2007 | Kusumoto et al. | 257/750 |

(Continued)

FOREIGN PATENT DOCUMENTS

| | | |
|---|---|---|
| JP | 2003-223990 A | 8/2003 |
| JP | 2004-157499 A | 6/2004 |

(Continued)

OTHER PUBLICATIONS

Japanese Office Action mailed Mar. 5, 2013 for corresponding Japanese Application No. 2009-209631, with Partial English-language Translation.

*Primary Examiner* — Jarrett Stark
(74) *Attorney, Agent, or Firm* — Fujitsu Patent Center

(57) ABSTRACT

A display device and a method of manufacturing the same, the display includes: an electrode plate operable to have a radio-frequency wave to pass therethrough; a light-emitting portion disposed in a direction of one surface of the electrode plate, the light-emitting portion including the electrode plate serving as a back electrode; and an antenna disposed in a direction of another surface of the electrode plate, the antenna having a stripline structure or a microstrip line structure and using a potential of the electrode plate as a reference potential.

18 Claims, 10 Drawing Sheets

(56) References Cited

U.S. PATENT DOCUMENTS

| | | | |
|---|---|---|---|
| 2009/0134791 A1 | 5/2009 | Kubota | |
| 2010/0207506 A1* | 8/2010 | Kwon | 313/323 |
| 2011/0012794 A1* | 1/2011 | Schlub et al. | 343/702 |
| 2012/0012846 A1* | 1/2012 | Isa et al. | 257/57 |
| 2012/0019419 A1* | 1/2012 | Prat et al. | 343/702 |

FOREIGN PATENT DOCUMENTS

| | | |
|---|---|---|
| JP | 2004-206243 A | 7/2004 |
| JP | 2004-259546 A | 9/2004 |
| JP | 2005-323223 A | 11/2005 |
| JP | 3139978 U | 2/2008 |
| JP | 2009-129823 A | 6/2009 |

\* cited by examiner

FIG. 4

| ELECTRODE MATERIAL | VOLUME RESISTIVITY ($\Omega \cdot m$) | TRANSMISSIVE PROPERTY |
|---|---|---|
| COPPER | $1.72 \times 10^{-8}$ | × |
| SILVER | $1.62 \times 10^{-8}$ | × |
| CARBON | $1.38 \times 10^{-3}$ | ○ |
| ITO | $0.2 \sim 0.4 \times 10^{-5}$ | ○ |

DISPLAY DEVICE HAVING AN ANTENNA AND METHOD OF MANUFACTURING SAME

CROSS-REFERENCE TO RELATED APPLICATION

This application is based upon and claims the benefit of priority of the prior Japanese Patent Application No. 2009-209631, filed on Sep. 10, 2009, the entire contents of which are incorporated herein by reference.

FIELD

The embodiments discussed herein are related to display device shaving antennas and a method of manufacturing the same.

BACKGROUND

Services are increasing that are based on data communication carried out between contactless integrated circuit (IC) cards (such as SUICA™, EDY™ (provided by bitWallet, Inc. in Japan and a brand of prepaid type digital cash service), and ID™) and external terminals (such as readers/writers) therefor using radio waves. Each of such contactless IC cards includes a loop antenna and an IC. Radio frequency (RF) (e.g., 13.56 MHz) is used by services of this type.

Mobile phones having functions of the contactless IC cards are also emerging. In addition to the functions of the contactless IC cards, such mobile phones have the following functions. Upon being placed over readers/writers installed near large advertising media, such as large posters placed on a street, the mobile phones can send text messages and display web sites on display screens thereof. Such functions attract attention as new advertising mechanisms.

For example, Japanese Laid-open Patent Publication No. 2004-157499 discloses a reader/writer that is installed near a large poster placed in a public space to attract attention. The reader/writer transmits information matching a content of the large poster. As large advertising media replaces large posters, the practical use of paper-thin light-emitting elements, such as an organic electroluminescence (EL) and an inorganic EL, is underway.

SUMMARY

According to an aspect of an embodiment, a display device and a method of manufacturing the same includes: an electrode plate operable to have a radio-frequency wave to pass therethrough; a light-emitting portion disposed in a direction of one surface of the electrode plate, the light-emitting portion including the electrode plate serving as a back electrode; and an antenna disposed in a direction of another surface of the electrode plate, the antenna having a stripline structure or a microstrip line structure and using a potential of the electrode plate as a reference potential.

The object and advantages of the invention will be realized and attained by elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a table illustrating volume resistivity of copper, silver, carbon, and indium tin oxide (ITO) and whether copper, silver, carbon, and ITO allow a radio wave to pass therethrough.

DESCRIPTION OF EMBODIMENTS

In the figures, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element layer between the two elements, or one or more intervening elements may also be present.

Problems involving an arrangement of a reader/writer adjacent to a large advertising medium will be discussed.

(1) Problem with Positions of Large Advertising Medium and Reader/Writer

Figure 3:
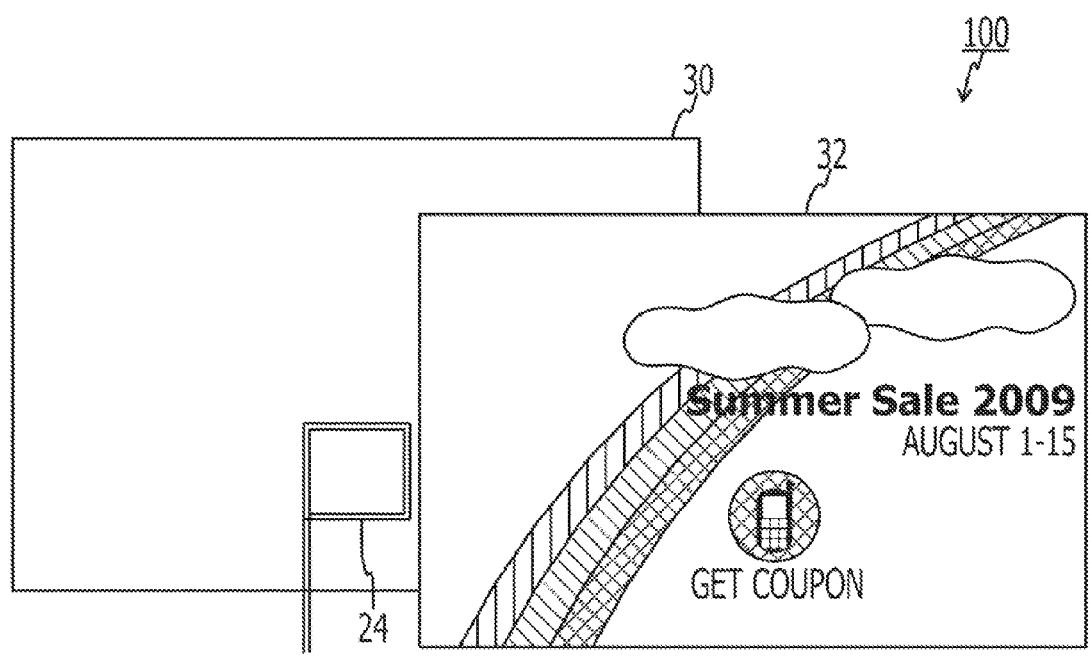
FIG. 3 depicts an example of arrangement of a sheet and an antenna electrode.

As depicted in FIG. 3 of Japanese Unexamined Patent Application Publication No. 2004-157499, a direction in which a user looks at a large advertising medium may deviate from a direction of a reader/writer. Accordingly, the user may overlook the reader/writer.

(2) Problem with Integration of Thin Advertising Medium and Reader/Writer

Since an existing reader/writer has a thickness of approximately 50 mm, the thickness of an integrated device increases depending on the thickness of the reader/writer even if an advertising medium is paper-thin (approximately 1 mm).

Problems involving integration of an antenna into an advertising medium will now be discussed.

(1) Problem with Quality of Displayed Advertisement Affected by Antenna Wiring Visible to Users For example, when a sheet of a light-emitting element, such as an organic EL or an inorganic EL, is used as an advertising medium, antenna wiring is arranged preferably on a foreground of the advertising medium for better communication performance. However, antenna wiring arranged in the foreground may block light emitted by the light-emitting element to degrade quality of the displayed advertisement.

(2) Problem with Length of Antenna Wiring

When an advertising medium includes an antenna, a length of wiring between a driving circuit and the antenna increases in proportion to the size of the advertising medium. In such a case, an increase in resistance of the wiring connected to the antenna may cause mismatching of impedance between the antenna and the driving circuit. Communication may fail because of the impedance mismatching. For example, when an inductance D of wiring that is 2 mm in width, 0.1 mm in thickness, and 100 mm in length is equal to 83 nanohenries (nH), an impedance Z at a frequency of 13.56 MHz generally used by contactless IC cards and readers/writers can be represented as Equation (1):

$$Z = 2\pi f D \quad (1)$$
$$= 2\pi \times 13.56 \times 10^6 \times 83 \times 10^{-9} = 7.072 \ \Omega$$

when the antenna is arranged along four sides of a B0-size (1030 mm×1456 mm. The B0-size is a standard of paper that provides with Japanese Industrial Standards (JIS). The B0 size is a size whose total of about four is 4972 mm.) sheet of a light-emitting element, the length of the wiring is up to (1030 mm+1456 mm)×2=4972 mm. In such a case, the impedance Z is equal to 351.6Ω. Since the impedance of the antenna increases in proportion to the length of the wiring, impedance mismatching between the antenna and a circuit connected to the antenna (i.e., a signal generating source) may be inevitable.

A display device 100 according to an embodiment for solving such problems will be described in detail below based on FIGS. 1-6.

Figure 1:
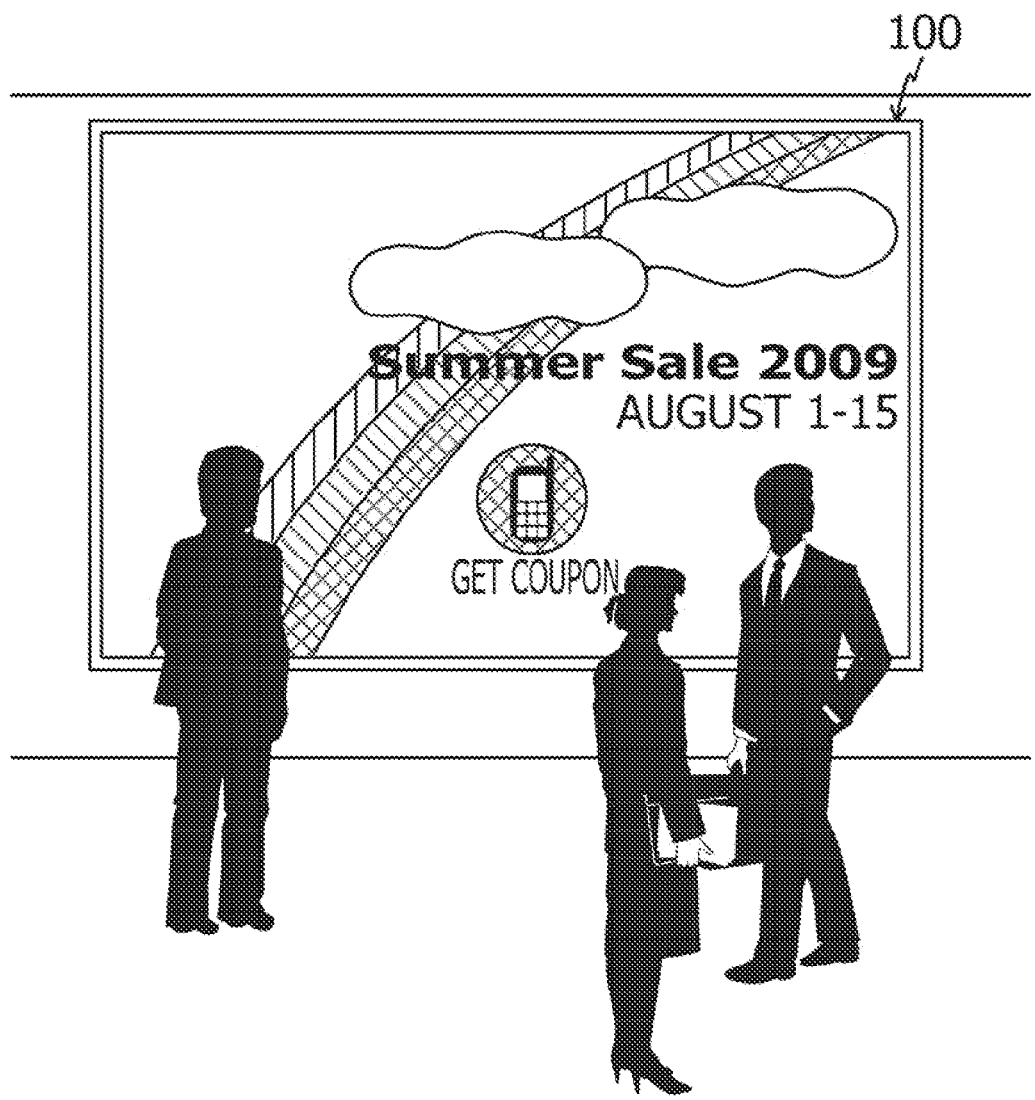
FIG. 1 depicts a usage example of a display device.

FIG. 1 depicts a usage example of the display device 100. As depicted in FIG. 1, the display device 100 which may be installed at passages of transportation stations and on walls of commercial facilities displays advertisements of products and events to passersby.

Figure 2:
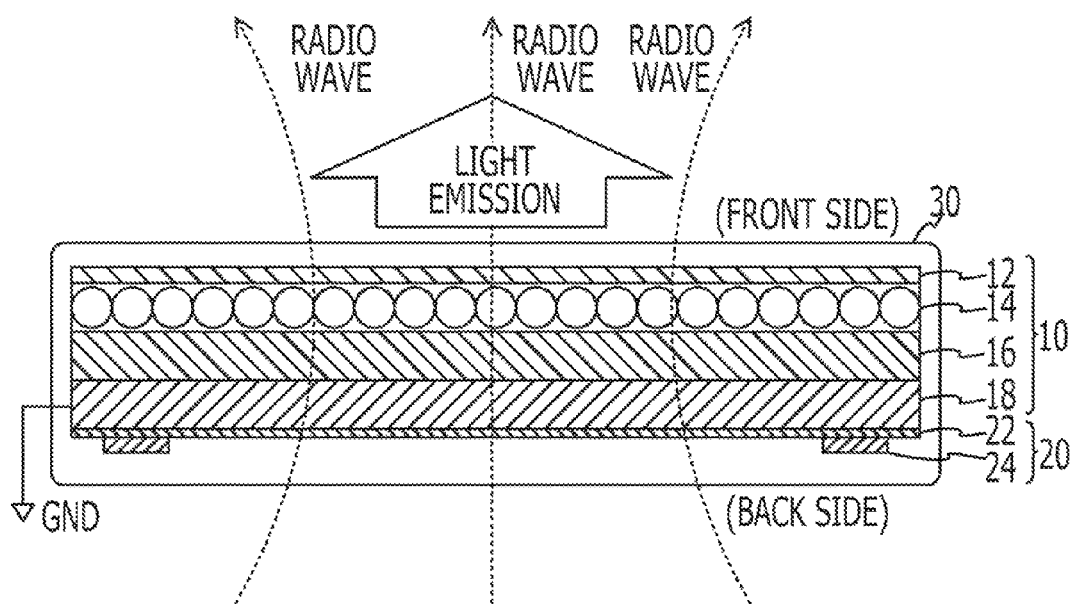
FIG. 2 depicts an example of a cross section of the display device.

The display device 100 has, for example, a structure depicted in an example of a cross-sectional view of FIG. 2. For example, the display device 100 includes, for example, a surface light-emitting element portion 10 serving as a light emitter, an antenna portion 20 serving as an antenna, and a package portion 30 for substantially enclosing the surface light-emitting element portion 10 and the antenna portion 20. The package portion 30 may be made of a material, such as polyethylene terephthalate (PET), that is waterproof. As depicted in FIG. 3, for example, an advertisement-printed sheet 32 having optical transparency is adhered on a surface (e.g., an upper surface in FIG. 2) of the package portion 30. The advertisement may also be printed directly on the surface of the package portion 30 without the sheet 32.

Referring back to FIG. 2, the surface light-emitting element portion 10 has a thickness of approximately 1 mm and includes a transparent electrode 12, a light emitter layer 14, a dielectric layer 16, and a back electrode 18 serving as an electrode plate. The transparent electrode 12 is made of, for example, indium tin oxide (ITO). The transparent electrode 12 may be made of a transparent conductive film, such as indium zinc oxide (IZO). The light emitter layer 14 includes particles of an inorganic fluorescent material, such as copper-doped zinc sulfide (ZnS:Cu), dispersed in an organic binder. Other than ZnS:Cu, the light emitter layer 14 may use manganese-doped zinc sulfide (ZnS:Mn). The light emitter layer 14 determines luminance and luminous efficiency of the surface light-emitting element portion 10. The inorganic fluorescent particles in the light emitter layer 14 determine the color of light emitted by the light emitter layer 14. For example, when ZnS:Cu is used as the inorganic fluorescent particles, the color of the light emitted by the light emitter layer 14 is blue-green. For example, when ZnS:Mn is used as the inorganic fluorescent particles, the color of the emitted light is orange.

The dielectric layer 16 includes ferroelectrics, such as barium titanate (BaTiO$_3$), dispersed in an organic binder. The back electrode 18 is connected to ground. FIG. 4 depicts, as a table, volume resistivity of each material, i.e., copper (Cu), silver (Ag), carbon (C), and ITO, and whether the material allows a radio wave to pass therethrough (transmissive property). As depicted in FIG. 4, carbon and ITO have a volume resistivity not as small as that of copper and silver and allow a radio wave to pass therethrough. Accordingly, the back electrode 18 is preferably made of carbon or ITO in this embodiment. With such a configuration, each of the transparent electrode (ITO) 12, the light emitter layer (ZnS:Cu) 14, the dielectric layer (BaTiO$_3$) 16, and the back electrode (carbon or ITO) 18 of the surface light-emitting element portion 10 allows a radio wave to pass therethrough. Thus, in accordance with this embodiment, the surface light-emitting element portion 10 allows a radio wave to pass therethrough.

To allow a radio wave to pass therethrough, the back electrode 18 may be made of a material having a volume resistivity larger than 1.0×10$^{-6}$ Ω·m. Accordingly, other materials having such a volume resistivity may be used to form the back electrode 18.

The surface light-emitting element portion 10 having such a configuration emits light in response to application of 1-kHz alternating voltage of approximately ±100 V across the transparent electrode 12 and the back electrode 18 by an alternator, not depicted, included in a surface-light-emitting-element-portion driving circuit (hereinafter, referred to as a first driving circuit) 40 (see FIG. 6). Since the sheet (advertisement) 32 adhered on the surface of the package portion 30 is illuminated by the emitted light, visibility of the advertisement can be improved.

As depicted in FIG. 2, the antenna portion 20 includes, for example, a dielectric layer 22 and an antenna electrode 24. The dielectric layer 22 also serves as a protection layer and is preferably made of, for example, medium of paint or pigment ink in an embodiment. The antenna electrode 24 is made of silver (Ag), for example. As depicted in FIG. 3, at least part of the antenna electrode 24 is in a loop shape. In FIG. 3, the loop of the antenna electrode 24 is arranged at a position corresponding to a part of the sheet 32 displaying an image of a mobile phone (e.g., a part displaying an image "GET COUPON"). As depicted in FIG. 2, the antenna portion 20 shares the back electrode 18 with the surface light-emitting element portion 10. Since the back electrode 18 is connected to ground, a microstrip line structure is realized. As depicted in FIG. 2, the antenna portion 20 transmits an RF wave (e.g., 13.56 MHz) from the back side and to the front side. Since the surface light-emitting element portion 10 has a property for allowing a radio wave to pass therethrough as described above, the radio wave generated by the antenna electrode 24 is transmitted outside (to the front side) through the surface light-emitting element portion 10 in this embodiment. This radio wave can be received by users' mobile phones. According to the embodiment, communication can be successfully carried out with mobile phones using the antenna portion 20 disposed on the back side of the surface light-emitting element portion 10. Additionally, the antenna portion 20 disposed on the back side does not block light emitted by the surface light-emitting element portion 10.

Advantages adoption of the microstrip line structure in the antenna portion 20 will now be described.

Figure 5:
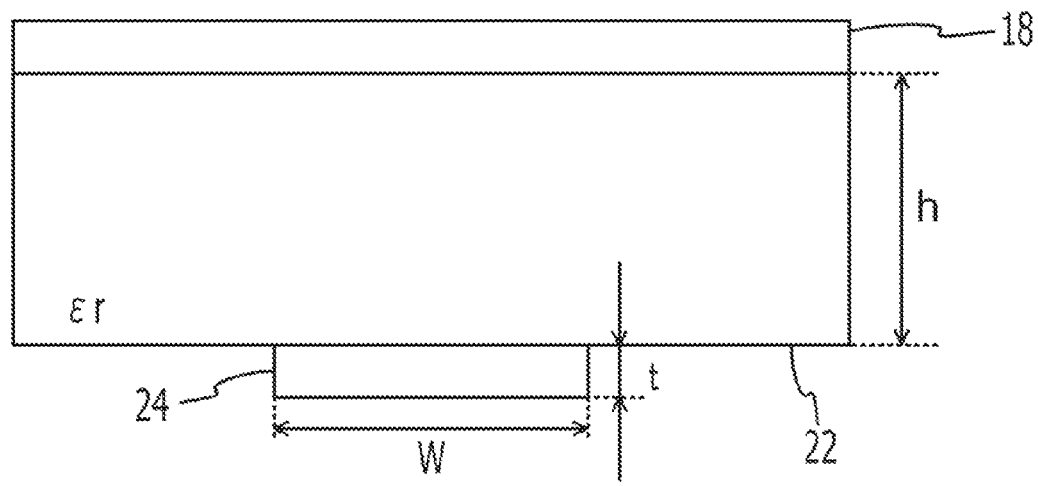
FIG. 5 schematically depicts a microstrip line structure.

Dimensions of the microstrip line are defined as depicted in FIG. 5. For example, a width and a thickness of the antenna electrode 24 are denoted as W and t, respectively. A thickness (i.e., height from the back electrode 18) and a relative dielectric constant of the dielectric layer 22 are denoted as h and C$_r$, respectively. In such a case, an impedance Z$_o$ can be represented as Equation (2).

$$Z_0 = \frac{60}{\sqrt{0.475 \times \varepsilon_r + 0.67}} \ln\left(\frac{4h}{0.67(0.8W + t)}\right) \quad (2)$$

A description will now be given for a case of adjusting the impedance $Z_0$ to match impedance (50Ω herein) of an antenna-portion driving circuit (hereinafter, referred to as a second driving circuit) 50 (see FIG. 6) using this Equation, for example. When wiring made of copper (Cu) has a length of the B0 size (=4972 mm), for example, simply setting the width W, the thickness t, and the thickness h equal to 0.25 mm, 18 μm, and 100 μm, respectively, yields the impedance $Z_0$ equal to 50.1Ω.

Since adoption of the microstrip line allows the impedance to be easily set equal to a desired value, mismatching impedance can be avoided or at least reduced even if the wiring is long. The foregoing calculation can be executed with dedicated software.

Figure 6:
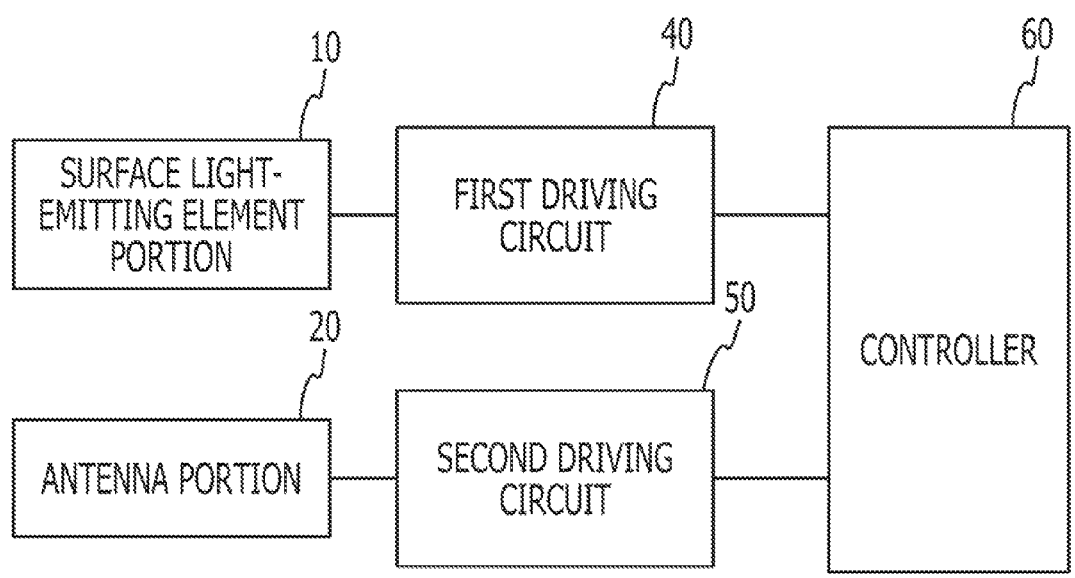
FIG. 6 depicts an example of a control system of the display device.

FIG. 6 depicts an example of a control system of the display device 100. As depicted in FIG. 6, the control system of the display device 100 includes, for example, the first driving circuit 40 for driving the surface light-emitting element portion 10, the second driving circuit 50 for driving the antenna portion 20, and a controller 60 for controlling the first and second driving circuits 40 and 50. The controller 60 controls the first driving circuit 40 when the surface light-emitting element portion 10 emits light. The controller 60 also controls the second driving circuit 50 when the antenna portion 20 transmits an RF wave. The RF wave transmitted by the antenna portion 20 can carry information related to an advertisement, e.g., URL information of a web site having coupon information in the example of FIG. 1.

When a user is interested in an advertisement displayed on the display device 100 depicted in FIG. 1 or when the user wants the coupon, the user can acquire the URL information of the web site having the coupon information by placing their mobile phone over the displayed image "GET COUPON". In this way, the user can check details of the advertisement on a screen of their mobile phone and use the coupon.

As described above, the display device 100 according to this embodiment includes the back electrode 18 that allows an RF wave (e.g., 13.56 MHz) to pass therethrough, the surface light-emitting element portion 10 that is disposed in a direction of one surface of the back electrode 18 and includes the back electrode 18, and the antenna portion 20 in the microstrip line structure that is disposed in a direction of the other surface of the back electrode 18 and uses potential of the back electrode 18 as reference potential thereof. Accordingly, even if the antenna portion 20 is arranged on the side of the back electrode 18 opposite to the side having the surface light-emitting element portion 10, the antenna portion 20 can transmit a generated radio wave outside through the back electrode 18. Since the antenna portion 20 does not block light emitted by the surface light-emitting element portion 10, the display device 100 can maintain high display quality. Since the antenna portion 20 arranged in the direction opposite to the light-emitting direction of the surface light-emitting element portion 10 is included in the display device 100, users can receive information from the antenna portion 20 by bringing their mobile phones near an advertisement displayed by the surface light-emitting element portion 10. Such a configuration can decrease a likelihood that users overlook a reader/writer compared to a case where the reader/writer is installed near the advertisement as in the case of the related art and, thus, can improve usability. Furthermore, the microstrip line structure of the antenna portion 20 can make the antenna portion 20 thin and, ultimately, the display device 100 thin. The microstrip line structure also allows the impedance of the antenna portion 20 to be easily adjusted to the impedance of the second driving circuit 50. Furthermore, since the surface light-emitting element portion 10 is formed of an inorganic EL in this embodiment, the display device 100 can be bent (flexible). Accordingly, the display device 100 can be placed on non-flat objects, such as a column.

In addition, since the back electrode 18 is preferably made of a material having a volume resistivity larger than $1.0 \times 10^{-6}$ Ω·m in this embodiment, the back electrode 18 advantageously allows a radio wave to pass therethrough to the front side even if the antenna portion 20 is arranged on the back side of the back electrode 18.

Furthermore, in this embodiment, the first driving circuit 40 for controlling driving of the surface light-emitting element portion 10 and the second driving circuit 50 for controlling driving of the antenna portion 20 allow emission of light and transmission and reception of information to be suitably executed, respectively.

Figure 7:
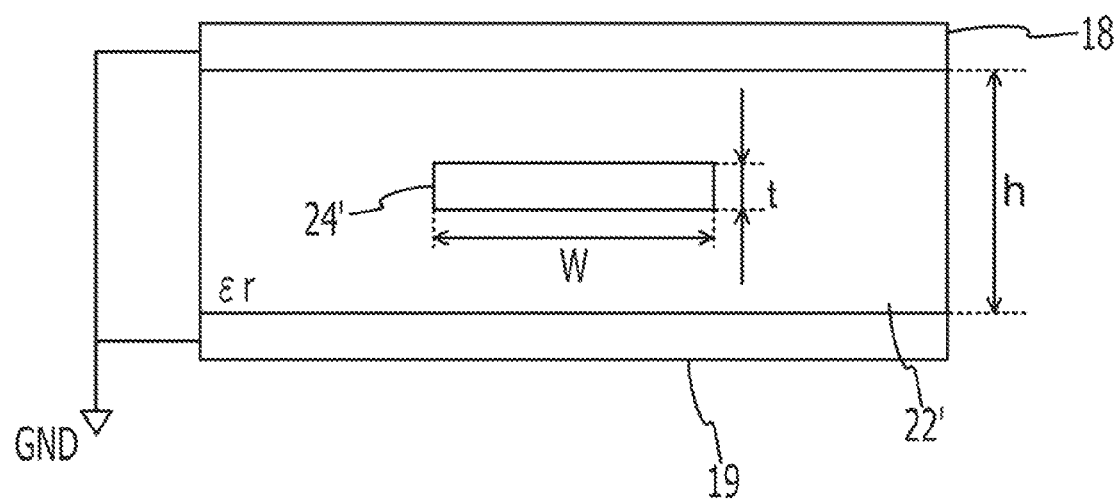
FIG. 7 schematically depicts a stripline structure.

Although the antenna portion 20 having the microstrip line structure has been described in the foregoing embodiment, the structure of the antenna portion 20 is not limited to this one. For example, the antenna portion 20 may have a stripline structure. FIG. 7 schematically depicts the stripline structure. As depicted in FIG. 7, the stripline structure includes an antenna electrode 24' disposed inside a dielectric layer 22'. Discussion will be given, for example, for adjustment of an impedance $Z_0$ of the antenna portion 20 having such a structure to 50Ω as in the case of the foregoing embodiment. When wiring made of copper (Cu) has a length of the B0 size (=4972 mm), for example, simply setting a width W, a thickness t, and a thickness h equal to 58 μm, 1 μm, and 100 μm, respectively, yields the impedance $Z_0$ equal to 50.3Ω. Accordingly, the impedance can be easily matched.

Since the stripline structure allows the impedance to be easily set to a desired value in this way, mismatching impedance can be avoided or at least reduced even if the wiring is long.

Although not mentioned in the foregoing embodiment, the first driving circuit 40, the second driving circuit 50, and the controller 60 of the control system depicted in FIG. 6 may be arranged near or away from the surface light-emitting element portion 10. For example, the controller 60 arranged at a location away from the surface light-emitting element portion 10 may remotely control a plurality of surface light-emitting element portions and a plurality of antenna portions in an integrated fashion. The controller 60 may be connected to the first and second driving circuits 40 and 50 with or without a cable. Additionally, the controller 60 may be connected to the first and second driving circuits 40 and 50 via the Internet and a local area network (LAN).

Although the loop of the antenna portion 20 (i.e., the antenna electrode 24) is arranged at the position corresponding to the part of the sheet 32 displaying the image of the mobile phone (i.e., the part displaying an image "GET COUPON") in the foregoing embodiment, the position of the loop is not limited to this arrangement. For example, the loop of the antenna portion 20 (the antenna electrode 24) may be arranged to cover a surface of the sheet 32.

Figure 8:
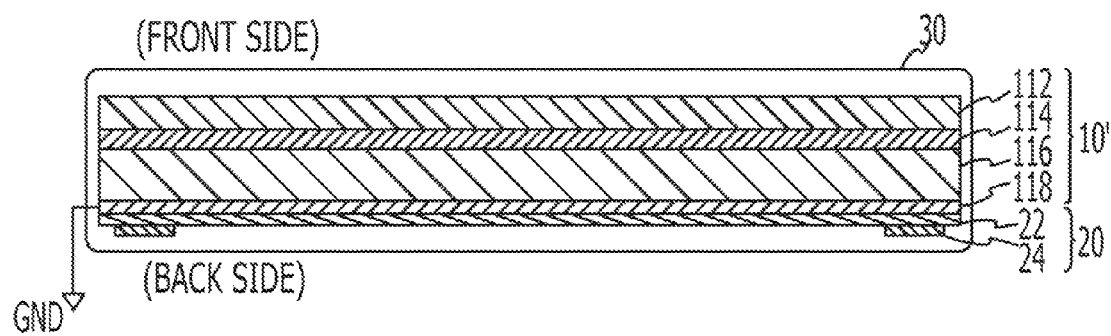
FIG. 8 depicts an example case of adopting an organic EL serving as a surface light-emitting element portion.

Although an inorganic EL is, not limitedly, used as the surface light-emitting element portion 10 of the display device 100 in the foregoing embodiment, an organic EL may be used. FIG. 8 depicts an example case where an organic EL 10' is adopted as the surface light-emitting element portion. As depicted in FIG. 8, the organic EL 10' includes, for example, a glass substrate 112, a transparent electrode 114, a light emitter layer 116, and a back electrode 118. The transparent electrode 114 is made of, for example, ITO. The back electrode 118 is made of, for example, carbon or ITO just like the foregoing embodiment. The back electrode 118 may be shared with an antenna portion 20 just like the foregoing embodiment. Such a configuration allows a radio wave generated by the antenna portion 20 to be transmitted from the back side to the front side through the organic EL 10' as in the case of the foregoing embodiment. Accordingly, the configuration can offer advantages similar to those provided by the foregoing embodiment.

Even when the organic EL is adopted as depicted in FIG. 8, the antenna portion 20 may have the stripline structure depicted in FIG. 7.

Figure 9:
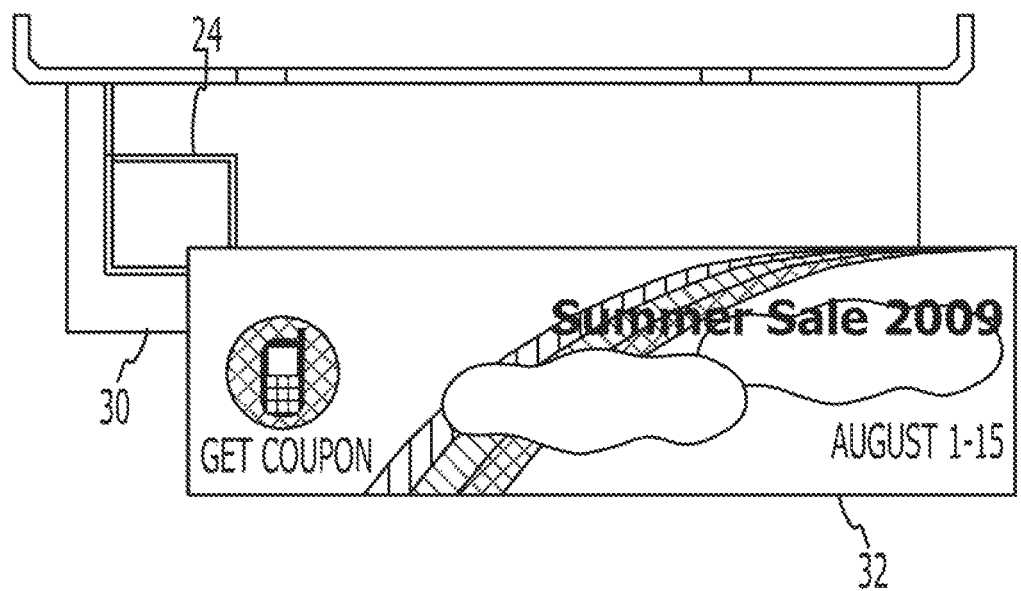
FIG. 9 depicts a first modification of the usage example of the display device.
Figure 10:
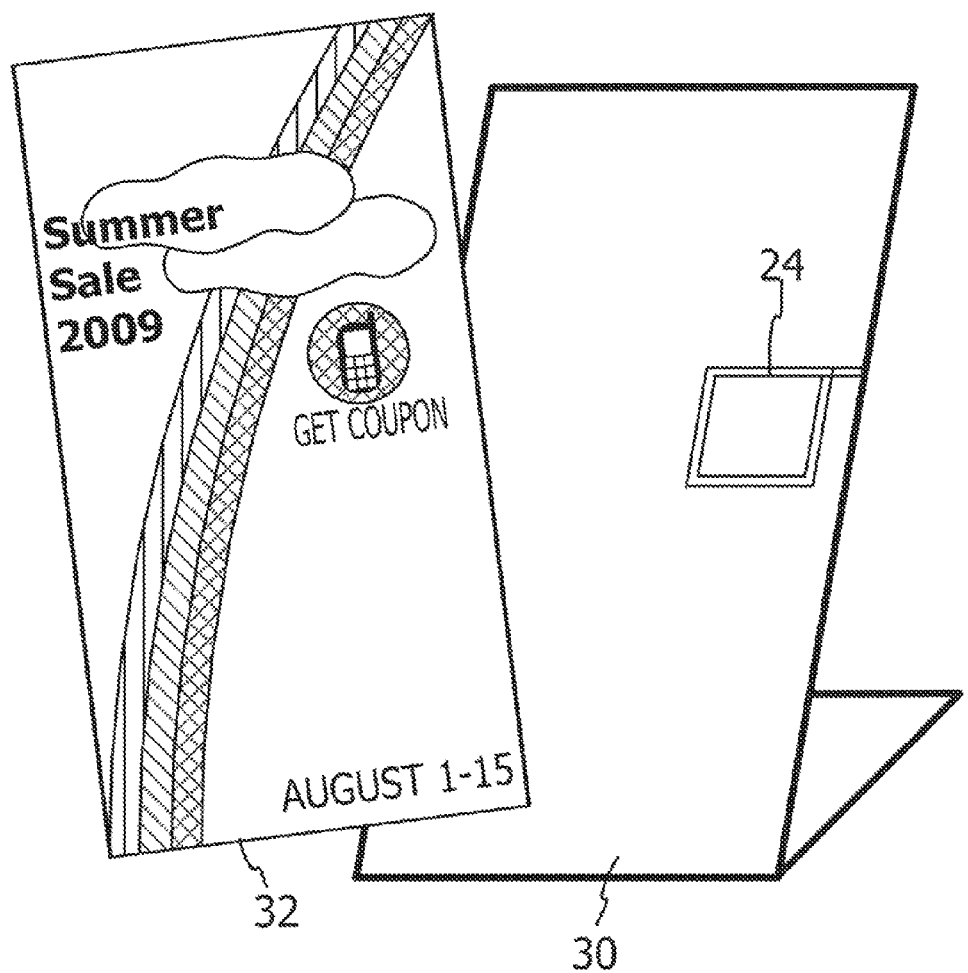
FIG. 10 depicts a second modification of the usage example of the display device.

Although application of the display device 100 to large posters placed at stations has been described in the foregoing embodiment, the application of the display device 100 is not limited to this example. For example, as depicted in FIG. 9, the display device 100 can be applied to an advertisement placed in a train or a bus. The display device 100 can also be applied to a billboard as depicted in FIG. 10. In such cases, the antenna electrode 24 may be arranged at a position corresponding to a part displaying an image of a mobile phone or may be arranged to cover the advertisement or the billboard.

The above-described embodiments are preferable examples for carrying out the present invention. However, the present invention is not limited to the embodiments and can be variously modified without departing from the spirit of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A display device, comprising:
    an electrode plate operable to have a radio-frequency wave pass therethrough;
    a light-emitting portion disposed in a direction of one surface of the electrode plate, the light-emitting portion including the electrode plate serving as a back electrode; and
    an antenna disposed in a direction of another surface of the electrode plate, the antenna having a stripline structure or a microstrip line structure and using potential of the electrode plate as reference potential.

2. The display device according to claim 1, wherein the electrode plate has a volume resistivity larger than $1.0 \times 10^{-6}$ $\Omega \cdot m$.

3. The display device according to claim 1, further comprising:
    a light-emitter driving controller configured to control driving of the light-emitting portion; and
    an antenna driving controller configured to control driving of the antenna.

4. The display device according to claim 3, wherein the antenna and the antenna driving controller constitute at least part of an apparatus for exchanging information with an external terminal.

5. The display device according to claim 1, further comprising:
    a dielectric layer positioned between the light-emitting portion and the electrode plate.

6. The display device according to claim 1, further comprising:
    a package portion enclosing the electrode plate, the light-emitting portion, and the antenna.

7. The display device according to claim 1, wherein the light-emitting portion includes any one of copper-doped zinc sulfide (ZnS:Cu) and manganese-doped zinc sulfide (ZnS:Mn).

8. The display device according to claim 1, further comprising:
    a transparent electrode attached to the light-emitting portion.

9. The display device according to claim 1, wherein the transparent electrode includes any one of indium tin oxide (ITO) and indium zinc oxide (IZO).

10. The display device according to claim 1, wherein the antenna includes an antenna electrode.

11. A method of manufacturing a display device comprising:
    providing an electrode plate that allows a radio-frequency wave to pass therethrough;
    disposing a light emitter in a direction of one surface of the electrode plate, the light emitter including the electrode plate serving as a back electrode;
    disposing an antenna in a direction of another surface of the electrode plate, the antenna having a stripline structure or a microstrip line structure; and using a potential of the electrode plate as reference potential.

12. The method according to claim 11, further comprising: setting an impedance of the antenna to a predetermined value.

13. The method according to claim 11, further comprising:
    providing a light-emitter driving controller configured to control driving of the light emitter; and
    providing an antenna driving controller configured to control driving of the antenna.

14. The method according to claim 13, wherein the antenna and the antenna driving controller constitute at least part of an apparatus for exchanging information with an external terminal.

15. The method according to claim 11, further comprising:
    positioning a dielectric layer between the light emitter and the electrode plate.

16. The method according to claim 11, further comprising:
    substantially enclosing the electrode plate, the light emitter, and the antenna.

17. The method according to claim 11, further comprising:
    attaching a transparent electrode to the light emitter.

18. The method according to claim 11, further comprising:
    providing the antenna with an antenna electrode.

* * * * *